United States Patent [19]
Yumoto et al.

[11] Patent Number: 4,502,930
[45] Date of Patent: Mar. 5, 1985

[54] METHOD FOR MANUFACTURE OF 7-SUBSTITUTED QUADRICYCLENE-CYCLODEXTRIN INCLUSION COMPOUND

[75] Inventors: Takaari Yumoto, Nagoya; Kiyoshi Hayakawa, Gifu; Kaoru Kawase, Nagoya; Hiromi Yamakita, Owari-Asahi; Hiroshi Taoda, Nagoya, all of Japan

[73] Assignees: Agency of Industrial Science & Technology; Ministry of International Trade & Industry, both of Tokyo, Japan

[21] Appl. No.: 584,739

[22] Filed: Feb. 29, 1984

[30] Foreign Application Priority Data

Jun. 27, 1983 [JP] Japan ................................. 58-116725
Jun. 27, 1983 [JP] Japan ................................. 58-116729

[51] Int. Cl.³ ............................................. C08B 37/16
[52] U.S. Cl. ................................... 204/160.1; 536/103
[58] Field of Search ...................... 204/160.1; 536/103

[56] References Cited
U.S. PATENT DOCUMENTS 3,203,885  8/1965  Meiners et al. ................... 204/160.1
4,228,160  10/1980  Szejtli et al. ......................... 536/103

Primary Examiner—Jacob Ziegler
Attorney, Agent, or Firm—Oblon, Fisher, Spivak, McClelland & Maier

[57] ABSTRACT

A 7-substituted quadricyclene-cyclodextrin inclusion compound is manufactured by irradiating a 7-substituted norbornadiene-cyclodextrin inclusion compound with light.

3 Claims, No Drawings

METHOD FOR MANUFACTURE OF 7-SUBSTITUTED QUADRICYCLENE-CYCLODEXTRIN INCLUSION COMPOUND

BACKGROUND OF THE INVENTION

At present most thermal energy is being derived from the earth's natural resources such as petroleum, coal, and nuclear fuels. In recent years, the realization that these natural resources are limited has led to programs for harnessing sunlight as a source of thermal energy.

The utilization of sunlight requires development of an agent capable of effectively storing the heat of sunlight.

It has been known to the art that norbornadiene represented by the following formula is useful as an organic heat-storing agent.

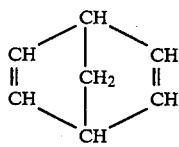

[Refer, for example, to Organic Syntheses 51, 133 (1971); R. R. Hautala, J. Little and E. Sweet, Solar Energy 19, 503 (1977).]

Norbornadiene, on exposure to light, is isomerized to quadricyclene represented by the following formula.

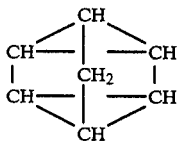

During this exposure, the energy of the sunlight is stored in the form of thermal energy. When quadricyclene is reverted to norbornadiene, thermal energy is liberated at the rate of 88 kJ per mole of quadricyclene.

The inventors have confirmed that 7-substituted norbornadienes produced by substituting a hydroxyl group, an acyloxy group, any of the alkyloxy groups, etc. for one of the hydrogen atoms attached to the 7 position of norbornadiene similarly function as organic heat storing agents.

The storage of heat during the isomerization of norbornadienes through irradiation with sunlight into corresponding quadricyclenes and the liberation of heat during the reverse of the isomerization, therefore, make it possible to utilize sunlight.

The aforementioned norbornadienes, however, tend to undergo photopolymerization in the presence of oxygen, have high volatility, undergo heavy loss during repeated use, and emit offensive odor. Because of these and other drawbacks, practical use of norbornadienes as heat storing agents poses many problems yet to be solved.

An object of this invention is to provide a method for the manufacture of a heat storing agent capable of storing light energy such as the energy of sunlight as thermal energy without entailing the drawbacks suffered by the aforementioned norbornadienes.

SUMMARY OF THE INVENTION

To accomplish the object described above according to this invention, there is provided a method for the manufacture of an inclusion compound comprised of a 7-substituted quadricyclene represented by the general formula (I):

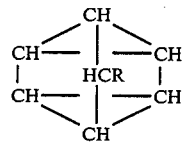

(wherein R denotes a hydrogen atom, a hydroxyl group, an acyloxy group, or an alkyloxy group) and a cyclodextrin which comprises irradiating an inclusion compound comprised of a 7-substituted norbornadiene represented by the general formula (II):

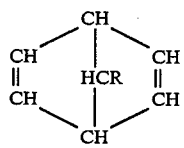

(wherein R has the same meaning as described above) and a cyclodextrin, optionally in the presence of a photosensitizer, with light.

DESCRIPTION OF THE PREFERRED EMBODIMENTS

The 7-substituted norbornadienes which are usable for the present invention are represented, as described above, by the general formula (II).

In all the compounds represented by the general formula (II), the compound having hydrogen as the substituent R is most desirable from the economical point of view. When the substituent R of the general formula (II) includes an alkyl group or an acyl group, the number of carbon atoms of that group is desired to fall in the range of 1 to 4, the group in which the inclusion compound aimed at is formed with ease.

The irradiation of an inclusion compound comprising a compound of the aforementioned general formula (II) and cyclodextrin with light results in the formation of an inclusion compound of 7-substituted quadricyclene represented by the aforementioned general formula (I) and cyclodextrin. What is described above concerning the substituent R in the general formula (II) exactly applies to the substituent R in the 7-substituted quadricyclene of the general formula (I).

The cyclodextrin of the inclusion compound may be any of the three types α, β, and γ. Although one of these three types is independently used, any two or all of the three types may be used in a mixed form. Use of the β type is particularly advantageous.

The inclusion compound including a 7-substituted norbornadiene occurs in a powdery form and can be subjected in its powdery form to the photoisomerization reaction. Optionally, it may be subjected to the photoisomerization reaction as suspended in a suitable liquid such as, for example, water, n-hexane, benzene, toluene, or ethylene glycol. When this inclusion compound is subjected to the photoisomerization reaction in its powdery form, it is kept suspended in an inert gas such as nitrogen gas or scattered over a wide area so as to be exposed uniformly to the light.

Examples of the source of light required for the photoisomerization reaction include the sun, a high-pressure mercury vapor lamp, a low-pressure mercury vapor lamp, and a xenon lamp.

When a 7-substituted norbornadiene alone is irradiated with light, the reaction does not readily proceed and the yield of the reaction is low unless this compound is thoroughly stripped of dissolved oxygen. In the case of the 7-substituted norbornadiene-cyclodextrin inclusion compound (hereinafter referred to as "7-SN-S" for short), it readily undergoes the isomerization even in the air without producing any discernible secondary products such as oxides and polymers. The temperature of irradiation is in the range of 0° to 100° C.

The presence of a photosensitizer during irradiation of the 7-SN-S with light improves the conversion ratio of the 7-SN-S to the 7-substituted quadricyclene-cyclodextrin inclusion compound (hereinafter referred to as "7-SQ-S" for short).

Examples of photosensitizers usable for this purpose include acetone, acetophenone, benzophenone, toluene, 2-naphthoaldehyde, triphenylene, benzil, pentadiene, phenanthrene, 2-acetonaphthone, acetylbiphenyl, benzene, naphthyl phenyl ketone, anthraquinone, naphthalene, anthracene, derivatives of these compounds, copper chloride (I) and other metal salts. These compounds may be used singly or in any combination.

The amount of the photosensitizer to be added to the reaction system is desired to fall in the range of 0.1 to 10% by weight based on the amount of the 7-SN-S. Optionally, this amount may be increased up to 100% by weight.

The 7-SQ-S which is obtained as described above may be identified by the following procedure, for example.

The produced inclusion compound is thoroughly stirred with benzene added thereto in volume about 10 times as large to obtain a cyclodextrin phase and a benzene extract phase. By removing benzene from the benzene extract phase and then distilling the residual oil, there is obtained the 7-substituted quadricyclene. When the quadricyclene so produced happens to be of the type having a hydrogen atom as the substituent R in the general formula (I), the NMR spectrum of the residual oil shows an absorption by cyclopropyl proton at 1.41 ppm and an absorption by the proton of methylene at the 7 position at 1.99 ppm, enabling the residual oil to be identified as quadricyclene. Even when the product has other substituent than a hydrogen atom, the identification thereof can be accomplished by the same procedure.

The 7-SQ-S which is obtained by the method of this invention is capable of storing light energy very efficiently in the form of thermal energy. The compound liberates this thermal energy when it is reverted to the 7-SN-S by a suitable method such as by the action of a catalyst. The 7-SN-S resulting from this reversion can again be exposed to light and consequently isomerized to the 7-SQ-S, whereby it will again store thermal energy. This cycle of isomerization and reversion can be repeated many times over a long period of time, without entailing any appreciable loss of the compounds due to secondary reaction or volatilization or emission of offensive odor. Since the 7-SQ-S is in a powdery form, it can be stored very conveniently and used advantageously in the solar system.

Now, the present invention will be described more specifically below with reference to working examples.

EXAMPLE 1

In petri dish made of hard glass and having an outside diameter of 60 mm, 1.2168 g (0.009 mol) of norbornadiene-$\beta$-cyclodextrin inclusion compound was uniformly spread out. With a lid of the same material set in position on the petri dish, the inclusion compound in the petri dish was exposed to outdoor sunlight for 7 hours at temperatures of 23.0° to 38.4° C. After the exposure, the contents of the petri dish weighed 1.244 g.

The quadricyclene thus produced was analyzed by gas chromatography, whereby the raw material was found to be converted as follows.

A 0.10-g sample of the inclusion compound obtained after the exposure was thoroughly stirred with 0.3 ml of benzene added thereto for extraction. Consequently the quadricyclene passed into the benzene phase. A stated amount of this benzene solution was taken as a sample and subjected to gas chromatography, whereby there was obtained a chart representing the amounts of the respective constituents of the sample in terms of area. By this same procedure, a sample of the inclusion compound not yet exposed to the sunlight was analyzed. From the ratio of two areas consequently obtained based on benzene, the conversion ratio was calculated to be 26.2%.

The produced quadricyclene was identified by the following method. The benzene extract of the exposed sample was distilled to expel benzene and the resultant residual oil was assayed by NMR spectroscopy. In the NMR spectrum, an absorption by cyclopropyl proton appeared at 1.41 ppm and an absorption by the proton of methylene at the 7-position at 1.99 ppm. Thus, the residual oil was identified to be quadricyclene.

EXAMPLE 2

In a petri dish made of hard glass and having an outside diameter of 60 mm, 0.7212 g (0.0005 mol) of norbornadiene-$\beta$-cyclodextrin inclusion compound was uniformly spread out. With a lid of the same material set in position on the petri dish, the inclusion compound in the petri dish was exposed to outdoor sunlight for 7 hours at temperatures of 22.0° to 39.2° C.

After the exposure, by following the procedure of Example 1, the produced quadricyclene was analyzed by gas chromatography. Consequently, the conversion ratio was found to be 21.0%.

EXAMPLE 3

In a petri dish made of hard glass and having an outside diameter of 60 mm, 1.0244 g (0.0008 mol) of norbornadiene-$\beta$-cyclodextrin inclusion compound was uniformly spread out. With a lid of the same material set in position on the petri dish, the inclusion compound in the petri dish was exposed to outdoor sunlight for 6 hours at temperatures of 25.3° to 39.2° C. After the exposure, by following the procedure of Example 1, the produced quadricyclene was analyzed by gas chromatography. Consequently, the conversion ratio was found to be 39.8%.

EXAMPLE 4

In a petri dish made of hard glass and having an outside diameter of 60 mm, 0.5001 g (0.001 mol) of 7-t-butoxy-norbornadiene-$\beta$-cyclodextrin inclusion compound was uniformly spread out. With a lid of the same material set in position on the petri dish, the inclusion compound was exposed to outdoor sunlight for 7 hours at temperatures of 9.8° to 15.3° C. After the exposure, by following the procedure of Example 1, the produced 7-t-butoxy-quadricyclene was analyzed by gas chromatography. Consequently, the conversion ratio was found to be 4.0%.

EXAMPLE 5

In a petri dish made of hard glass and having an outside diameter of 60 mm, 0.5002 g (0.0009 mol) of 7-acetoxy-norbornadiene-β-cyclodextrin inclusion compound was uniformly spread out. With a lid of the same material set in position on the petri dish, the inclusion compound in the petri dish was exposed to outdoor sunlight for 7 hours at 9.8° to 15.3° C. After the exposure, by following the procedure of Example 1, the produced 7-acetoxy-quadricyclene was analyzed by gas chromatography. Consequently, the conversion ratio was found to be 17.2%.

EXAMPLE 6

In a petri dish made of hard glass and having an outside diameter of 60 mm, 0.5003 g (0.0009 mol) of 7-norbornadienol-β-cyclodextrin inclusion compound was uniformly spread out. With a lid of the same material set in position on the petri dish, the inclusion compound in the petri dish was exposed to outdoor sunlight for 6 hours at temperatures of 24.5° to 35.4° C. After the exposure, by following the procedure of Example 1, the produced 7-quadricyclenol was analyzed by gas chromatography. Consequently, the conversion ratio was found to be 22.3%.

EXAMPLE 7

A saturated aqueous solution, 350 ml in volume, of norbornadiene-β-cyclodextrin inclusion compound was exposed to outdoor sunlight for 18.5 hours at temperatures of 19.8° to 28.0° C. After the exposure, the solution was extracted with benzene. The benzene extract was analyzed by gas chromatography in the same manner as in Example 1. Consequently, the conversion ratio of the produced quadricyclene was found to be 28.0%.

EXAMPLE 8

A saturated aqueous solution, 350 ml in volume, of norbornadiene-β-cyclodextrin inclusion compound was exposed to the light from a high-pressure mercury vapor lamp at room temperature (19.0° to 20.8° C.) for 24 hours. After the exposure, the solution was extracted with 10 ml of benzene. By following the procedure of Example 1, the benzene extract was analyzed by gas chromatography. Consequently, the conversion ratio of the produced quadricyclene was found to be 30.3%.

EXAMPLE 9

A mixed solution of 0.52 g of norbornadiene and 0.05 g of acetophenone was stirred into 350 ml of a saturated aqueous solution of β-cyclodextrin. The precipitate consequently produced was separated and dried, to afford 1.56 g (22% in yield) of norbornadiene cyclodextrin inclusion compound. In a petri dish made of hard glass and having an outside diameter of 60 mm, 0.50 g of the produced powdery compound was uniformly spread out. With a lid of the same material set in position on the petri dish, the inclusion compound in the petri dish was exposed to outdoor sunlight for 7 hours. After the exposure, the contents of the petri dish weighed 0.51 g and by following the procedure of Example 1, the produced quadricyclene was analyzed by gas chromatography. Consequently the conversion ratio was calculated to be 13.7%.

EXAMPLE 10

A mixed solution of 0.93 g of 7-t-butoxy-norbornadiene and 0.05 g of acetophenone was stirred into 350 ml of a saturated aqueous solution of β-cyclodextrin. The precipitate consequently produced was separated and dried, to afford 3.76 g (50% in yield) of 7-t-butoxy-norbornadiene cyclodextrin inclusion compound. In a petri dish made of hard glass and having an outside diameter of 60 mm, 0.50 g of the powdery inclusion compound was uniformly spread out. With a lid of the same material set in position on the petri dish, the inclusion compound in the petri dish was exposed to outdoor sunlight for 6 hours. After the exposure, the contents of the petri dish weighed 0.51 g. By following the procedure of Example 1, the produced 7-t-butoxy-quadricyclene was analyzed by gas chromatography. Consequently, the conversion ratio was found to be 4.9%.

EXAMPLE 11

A mixed solution of 0.86 g of 7-acetoxy-norbornadiene and 0.05 g of acetophenone was stirred into 350 ml of a saturated aqueous solution of β-cyclodextrin. The precipitate consequently formed was separated and dried to afford 1.31 g (18% in yield) of 7-acetoxy-norbornadiene cyclodextrin inclusion compound. In a petri dish made of hard glass and having an outside diameter of 60 mm, 0.50 g of the powdery inclusion compound was uniformly spread out. With a lid of the same material set in position on the petri dish, the inclusion compound in the petri dish was exposed to outdoor sunlight for 6 hours. After the exposure, the contents of the petri dish weighed 0.51 g. By following the procedure of Example 1, the produced 7-acetoxy-quadricyclene was analyzed by gas chromatography. Consequently, the conversion ratio was found to be 17.2%.

EXAMPLE 12

A mixed solution of 0.61 g of 7-norbornadienol and 0.05 g of acetophenone was stirred into 350 ml of a saturated aqueous solution of β-cyclodextrin. The precipitate consequently formed was separated and dried to afford 1.16 g (16.4% in yield) of 7-norbornadienol cyclodextrin inclusion compound. In a petri dish made of hard glass and having an outside diameter of 60 mm, 0.50 g of the powdery inclusion compound so produced was uniformly spread out. With a lid of the same material set in position on the petri dish, the inclusion compound in the petri dish was exposed to outdoor sunlight for 6 hours. After the exposure, the contents of the petri dish weighed 0.51 g. By following the procedure of Example 1, the formed 7-quadricyclenol was analyzed by gas chromatography. Consequently the conversion ratio was found to be 23.2%.

What is claimed is:

1. A method for the manufacture of an inclusion compound comprised of 7-quadricyclene represented by the general formula:

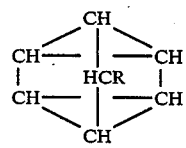

wherein R denotes one member selected from the group consisting of hydrogen atom, hydroxyl group, acyloxy group, and alkyloxy groups and cyclodextrin by the irradiation of an inclusion compound comprised of 7-substituted norbornadiene represented by the general formula:

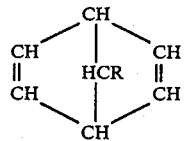

wherein R has the same meaning as described above and cyclodextrin with light.

2. A method according to claim 1, wherein said irradiation of said inclusion compound with light is effected in the presence of a photo-sensitizer.

3. A method according to claim 2, wherein said photo-sensitizer is at least one member selected from the group consisting of acetone, acetophenone, benzophenone, toluene, 2-naphthoaldehyde, triphenylene, benzil, pentadiene, phenanthrene, 2-acetonaphthone, acetylbiphenyl, benzene, naphthyl phenyl ketone, anthraquinone, naphthalene, anthracene, derivatives of the aforementioned compounds, and metal salts.

* * * * *